(12) United States Patent
Aso

(10) Patent No.: US 8,233,749 B2
(45) Date of Patent: Jul. 31, 2012

(54) IMAGE PROCESSING SYSTEM, PROJECTOR, METHOD AND COMPUTER PROGRAM PRODUCT

(75) Inventor: Satoshi Aso, Ibaraki (JP)

(73) Assignee: Seiko Epson Corporation, Tokyo (JP)

( * ) Notice: Subject to any disclaimer, the term of this patent is extended or adjusted under 35 U.S.C. 154(b) by 1027 days.

(21) Appl. No.: 12/188,812

(22) Filed: Aug. 8, 2008

(65) Prior Publication Data

US 2009/0052800 A1 Feb. 26, 2009

(30) Foreign Application Priority Data

Aug. 20, 2007 (JP) .................................. 2007-213669

(51) Int. Cl.
*G06K 9/32* (2006.01)

(52) U.S. Cl. .................. 382/300; 250/208.1; 348/222.1; 348/746; 382/275; 382/284; 382/299

(58) Field of Classification Search ........................ None
See application file for complete search history.

(56) References Cited

U.S. PATENT DOCUMENTS

| | | | |
|---|---|---|---|
| 6,191,827 B1* | 2/2001 | Segman et al. | 348/746 |
| 6,748,120 B1* | 6/2004 | Bradley | 382/299 |
| 6,753,907 B1* | 6/2004 | Sukthankar et al. | 348/222.1 |
| 7,245,319 B1* | 7/2007 | Enomoto | 348/222.1 |
| 2001/0038718 A1* | 11/2001 | Kumar et al. | 382/284 |
| 2002/0041717 A1* | 4/2002 | Murata et al. | 382/275 |
| 2005/0078879 A1* | 4/2005 | Sakurai et al. | 382/275 |
| 2006/0043264 A1* | 3/2006 | Sakurai | 250/208.1 |

FOREIGN PATENT DOCUMENTS

JP 2005-210418 8/2005

\* cited by examiner

*Primary Examiner* — Anand Bhatnagar
*Assistant Examiner* — Tsung-Yin Tsai
(74) *Attorney, Agent, or Firm* — AdvantEdge Law Group, LLC

(57) ABSTRACT

The disclosure refers to an image processing system, projector, method and computer program product. In one example, an image processing system includes an interpolation unit that performs interpolation using an input image and a reference pixel in an input background part outside of the input image and interpolation pixels including neighboring pixels around the reference pixel, and a target pixel location determination unit that determines a location of a target pixel with respect to an image after distortion correction in a display area of an optical modulator.

6 Claims, 4 Drawing Sheets

| Pixel of deformed image | Reference pixel | Neighboring pixel | Neighboring pixel | Neighboring pixel |
|---|---|---|---|---|
| B0 | Background | Pixel 2 | Background | Pixel 3 |
| L0 | Pixel 2 | Pixel 4 | Pixel 3 | Pixel 5 |
| B1 | Background | Pixel 8 | Background | Background |
| L1 | Pixel 8 | Pixel A | Background | Background |

IMAGE PROCESSING SYSTEM, PROJECTOR, METHOD AND COMPUTER PROGRAM PRODUCT

CROSS REFERENCE TO RELATED APPLICATIONS

The present application claims priority and incorporates herein by reference in its entirety Japanese Patent Application No. 2007-213669 filed Aug. 20, 2007.

BACKGROUND

It is necessary for a projector to correct distortion (trapezoidal distortion, keystone distortion) of projected images for appropriate image display. For example, as disclosed in Japanese Patent Publication No. JP-A-2005-210418, when the distortion of a projected image is corrected, interpolation processing of obtaining pixel values of the deformed image from plural pixel values of the original image is executed. Further, since the original image is deformed, a liquid crystal panel contains an image part and a background part other than the image part.

When the edge enhancement processing is executed or interpolation processing is executed only on the image part as in the technique of Japanese Patent Publication No. JP-A-2005-210418, the boundary part between the image part and the background part becomes jagged and the projected image becomes visually poor.

SUMMARY

An advantage of some aspects of the invention is to provide an image processing system, a projector, a program, and an information storage medium capable of more smoothly displaying a boundary part between an image part and a background part.

An image processing system according to an aspect of the invention includes an interpolation unit that performs interpolation using an input image and a reference pixel in an input background part outside of the input image and interpolation pixels including neighboring pixels around the reference pixel, and a target pixel location determination unit that determines a location of a target pixel with respect to an image after distortion correction in a display area of an optical modulator, wherein the reference pixel is located in contact with at least one side of a rectangular area formed by the interpolation pixels, and wherein, the interpolation unit performs the interpolation using the interpolation pixel corresponding to the target pixel when the target pixel is located in an output background part in contact with an oblique side of the image after distortion correction and the location of the oblique side with respect to the center of the image after distortion correction coincides with the location of the side in contact with the interpolation pixel with respect to the center of the rectangular area, and the interpolation unit does not perform the interpolation when the target pixel is located in the output background part not in contact with an oblique side of the image after distortion correction or the target pixel is located in the output background part in contact with an oblique side of the image after distortion correction, and the location of the oblique side with respect to the center of the rectangular area does not coincide with the location of the side in contact with the interpolation pixel with respect to the center of the rectangular area.

Further, a projector according to an aspect of the invention includes the above described image processing system and a projection unit that projects the interpolated image after distortion correction.

Furthermore, an image processing method according to an aspect of the invention includes of interpolating using an input image and a reference pixel in an input background part outside of the input image and interpolation pixels including neighboring pixels around the reference pixel, and determining a location of a target pixel with respect to an image after distortion correction in a display area of an optical modulator, wherein the reference pixel is located in contact with at least one side of a rectangular area formed by the interpolation pixels, and wherein, the interpolation is performed using the interpolation pixel corresponding to the target pixel when the target pixel is located in an output background part in contact with an oblique side of the image after distortion correction and the location of the oblique side with respect to the center of the image after distortion correction coincides with the location of the side in contact with the interpolation pixel with respect to the center of the rectangular area, and the interpolation is not performed when the target pixel is located in the output background part not in contact with an oblique side of the image after distortion correction or the target pixel is located in the output background part in contact with an oblique side of the image after distortion correction, and the location of the oblique side with respect to the center of the image after distortion correction does not coincide with the location of the side in contact with the interpolation pixel with respect to the center of the rectangular area.

Furthermore, a program according to an aspect of the invention allows a computer to perform the function of interpolating using an input image and a reference pixel in an input background part outside of the input image and interpolation pixels including neighboring pixels around the reference pixel, and determining a location of a target pixel with respect to an image after distortion correction in a display area of an optical modulator, wherein the reference pixel is located in contact with at least one side of a rectangular area formed by the interpolation pixels, and wherein, the interpolation is performed using the interpolation pixel corresponding to the target pixel when the target pixel is located in an output background part in contact with an oblique side of the image after distortion correction and the location of the oblique side with respect to the center of the rectangular area coincides with the location of the side in contact with the interpolation pixel with respect to the center of the rectangular area, and the interpolation is not performed when the target pixel is located in the output background part not in contact with an oblique side of the image after distortion correction or the target pixel is located in the output background part in contact with an oblique side of the image after distortion correction, and the location of the oblique side with respect to the center of the image after distortion correction does not coincide with the location of the side in contact with the interpolation pixel with respect to the center of the rectangular area.

According to some aspects of the invention, since the image processing system or the like can determine whether to perform the interpolation or not according to the location of the reference pixel and the location of the target pixel in the rectangular area formed by the interpolation pixels and perform interpolation, it can display the boundary part between the image part and the background part more smoothly, and suppress the color unevenness without performing unwanted interpolation.

Additionally, the interpolation unit may not perform the interpolation unless the interpolation pixel contains the pixel of the input image even when the target pixel is located in the output background part in contact with an oblique side of the image after distortion correction and the location of the oblique side with respect to the center of the image after distortion correction coincides with the location of the side in contact with the interpolation pixel with respect to the center of the rectangular area.

Thereby, the image processing system or the like can suppress the color unevenness without performing interpolation unless the interpolation pixel contains the pixel of the input image.

Further, the interpolation may be bilinear interpolation, and the interpolation pixel may include one of the reference pixel and three of the neighboring pixels.

Thereby, the image processing system or the like can display the boundary part between the image part and the background part more smoothly by bilinear interpolation.

BRIEF DESCRIPTION OF THE DRAWINGS

Embodiment of the disclosure is described with reference to the accompanying drawings, wherein like numbers reference like elements.

DESCRIPTION OF EXEMPLARY EMBODIMENTS

Hereinafter, embodiments in which the invention is applied to projectors will be described with reference to the drawings. The following embodiments do not impose any limitations on the description of the invention described in claims. Further, all of the configurations shown in the following embodiments are not necessarily essential as solving means for the invention described in claims.

First Embodiment

Figure 1:
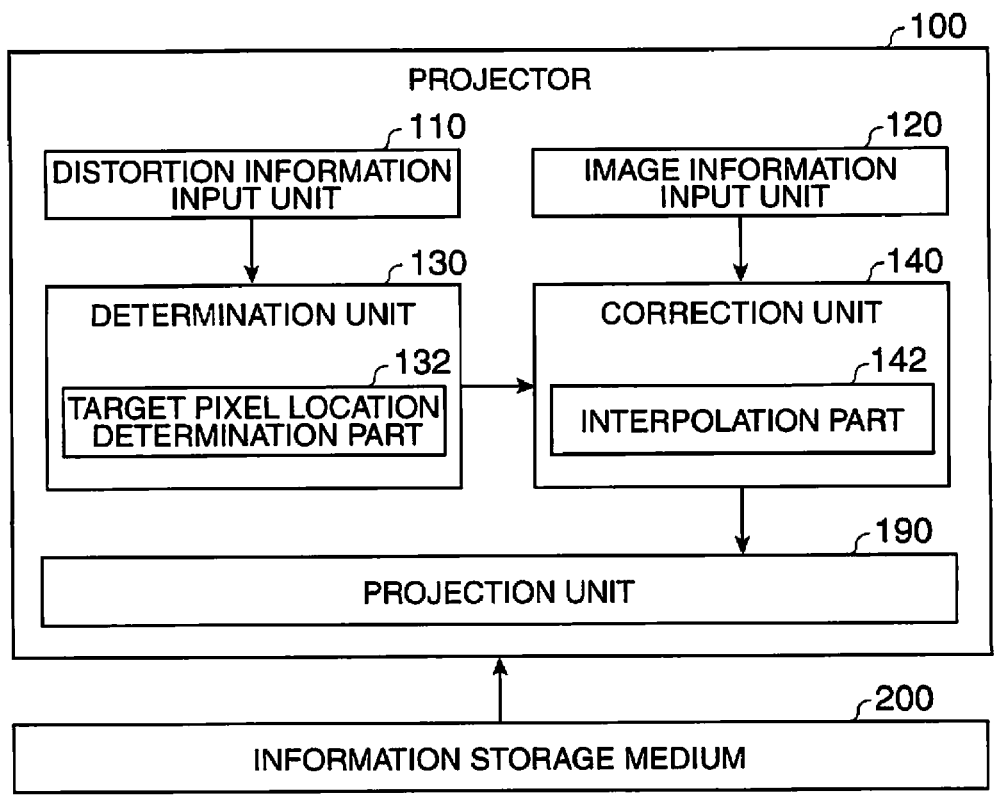
FIG. 1 is a functional block diagram of a projector in the embodiment.

FIG. 1 is a functional block diagram of a projector 100 in the embodiment. The projector 100 includes an image information input unit 120 that inputs image information (e.g., RGB signals or the like), a distortion information input unit 110 that inputs distortion information on distortion of a projected image, a determination unit 130 that determines a distortion state of the projected image based on the distortion information, a correction unit 140 that corrects the distortion of the image according to the distortion state, and a projection unit 190 that projects the image after distortion correction.

Further, the determination unit 130 includes a target pixel location determination part 132 that determines the location of a target pixel as a target of interpolation in a display area of a liquid crystal panel (optical modulator). Further, the correction unit 140 includes an interpolation part 142 that performs interpolation (e.g., interpolation of gray level values) using an input image and a reference pixel in an input background part outside of the input image and interpolation pixels including neighboring pixels around the reference pixel.

These units may be the following hardware respectively. For example, the distortion information input unit 110 may be a CCD sensor for imaging the area containing the image projected on the screen, a button for inputting operation information to correct the distorted image projected on the screen to the state with no distortion, an angle sensor that measures the projection angle, a distance sensor that measures the projection distance, etc. Further, the image information input unit 120 may be an image signal input terminal or the like, the determination unit 130 may be a CPU or the like, the correction unit 140 maybe an image processing circuit or the like, and the projection unit 190 may be a lamp, liquid crystal panel, liquid crystal drive circuit, projection lens, or the like.

Further, a computer of the projector 100 may mount the functions of the determination unit 130 etc. by reading programs from an information storage medium 200. As the information storage medium 200, for example, a CD-ROM, DVD-ROM, ROM, RAM, HDD, or the like may be applied, and the reading method of programs may be a contact method or non-contact method.

Figure 2:
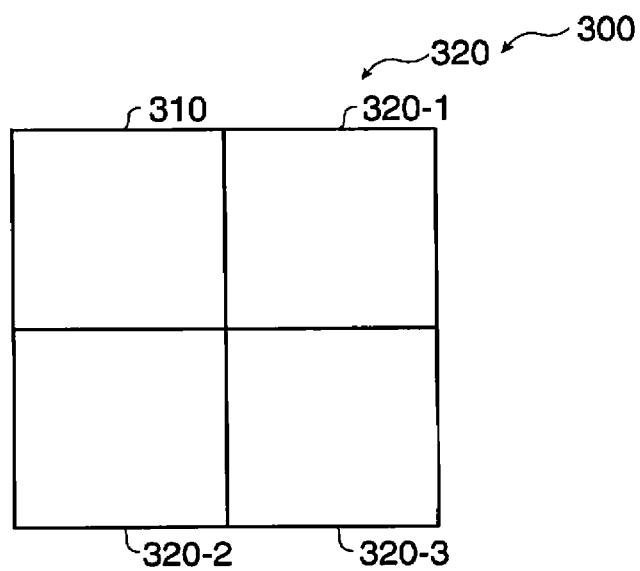
FIG. 2 shows an interpolation pixel at bilinear interpolation in the embodiment.

FIG. 2 shows an interpolation pixel 300 at bilinear interpolation in the embodiment. In the embodiment, the interpolation part 142 performs interpolation using the interpolation pixel 300 (four pixels) including a reference pixel 310 and three neighboring pixels 320-1 to 320-3 on the right, underneath, and lower right of the reference pixel 310.

Figures 3, 4:
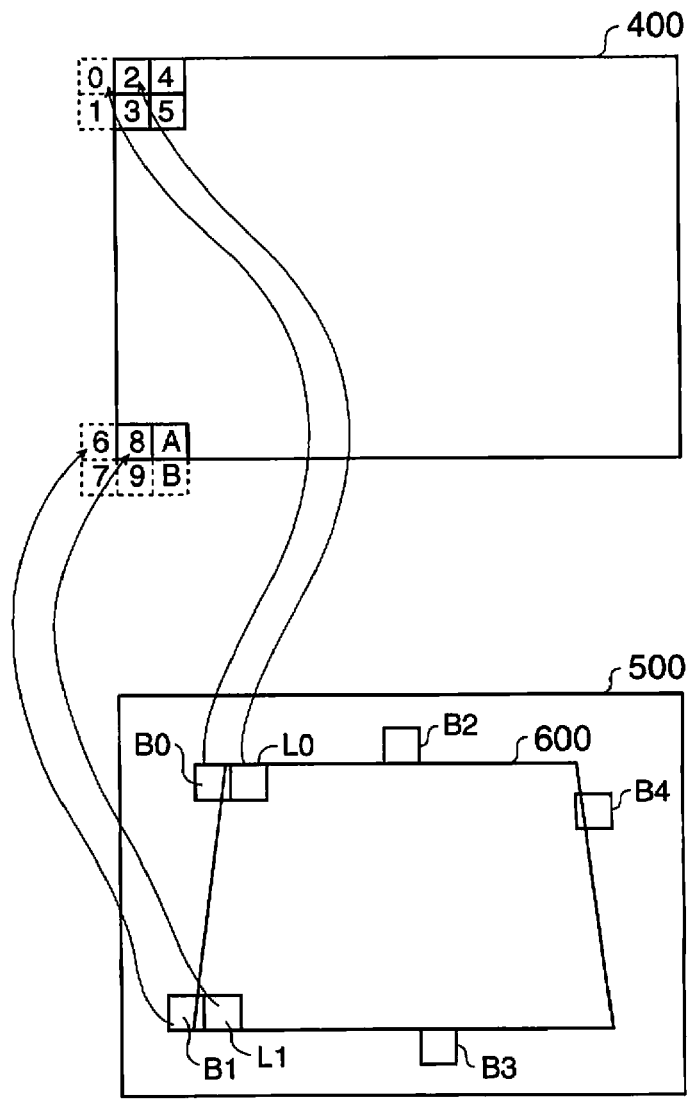
FIG. 3 shows an original image and a deformed image in the embodiment.
FIG. 4 shows the interpolation pixel of the original image corresponding to the pixels of the deformed image in the embodiment.

FIG. 3 shows an original image 400 and a deformed image 600 in the embodiment. Further, FIG. 4 shows the interpolation pixel 300 of the original image 400 corresponding to the pixels of the deformed image 600 in the embodiment.

The determination unit 130 determines the location of the deformed image (image after distortion correction) 600 in a display area 500 of a liquid crystal panel according to distortion information. For example, the target pixel location determination part 132 determines that the location of the pixel (target pixel) is outside of the deformed image 600 (output background part), inside of the deformed image 600, or in the output background part in contact with the oblique side of the deformed image 600 with respect to each pixel from the upper left pixel toward the lower right pixel in the display area 500. For example, in the example shown in FIG. 3, pixel B0 and pixel B1 are located in the output background part in contact with the oblique side, and the pixel L0 and pixel L1 are located inside of the deformed image 600.

The interpolation part 142 performs interpolation when the target pixel is located in the output background part in contact with the oblique side of the deformed image 600 and the oblique side is located on the left or upper part with respect to the center of the deformed image 600, or when the target pixel is located inside of the deformed image 600, and does not perform interpolation but processes as the background in the other cases. The interpolation is performed only when the oblique side is located on the left or upper part because the reference pixel 310 is on the upper left in the rectangular area of the interpolation pixel 300 and the display effect that the oblique side located on the right or lower part becomes blur can be obtained without interpolation.

For example, since the target pixel B0 is on the left oblique side part, the interpolation part 142 performs interpolation with pixel 0 (background) of the original image 400 as the reference pixel 310 using the pixel 0, pixel 2, pixel 1 (background), and pixel 3. Further, for interpolation of the pixel L0, the interpolation part 142 performs interpolation with pixel 2 of the original image 400 as the reference pixel 310 using the pixel 2, pixel 4, pixel 3, and pixel 5. For interpolation of the pixel B1, the interpolation part 142 performs interpolation with pixel 6 (background) of the original image 400 as the reference pixel 310 using the pixel 6, pixel 8, pixel 7 (background), and pixel 9 (background). Furthermore, for interpolation of the pixel L1, the interpolation part 142 performs interpolation with pixel 8 of the original image 400 as the reference pixel 310 using the pixel 8, pixel A, pixel 9, and pixel B (background).

For processing pixel B2 in the output background part at the upper side of the trapezoidal deformed image 600, the interpolation part 142 does not perform interpolation but process the pixel as the background because the pixel B2 is not in contact with the oblique side. Pixel B3 in the output background part at the lower side of the deformed image 600 is similarly processed as the background. Further, pixel B4 is processed as the background because the pixel is in contact with the oblique side of the deformed image 600 but the oblique side is located on the right.

Figure 5:
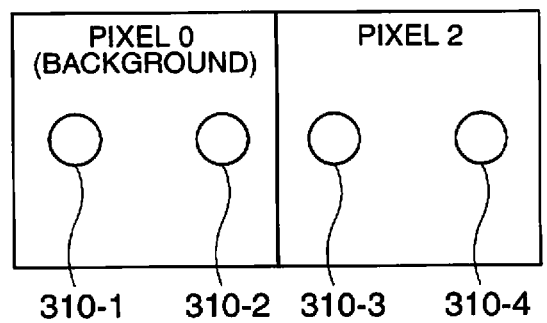
FIG. 5 shows a location of the reference pixel in the embodiment.

FIG. 5 shows a location of the reference pixel 310 in the embodiment. For example, when the reference pixel 310 of the pixel B0 is the reference pixel 310-1, the same background pixel (pixel 0) is used for interpolation. Using the same background pixel for interpolation may cause color unevenness. In order to prevent the situation, the interpolation part 142 is adapted not to perform interpolation unless the interpolation pixel 300 contains the pixel of the original image 400 even when the target pixel is located in the output background part in contact with the oblique side of the deformed image 600 and the oblique side is located on the left or upper part with respect to the center of the deformed image 600.

As described above, according to the embodiment, since the projector 100 can determine whether to perform the interpolation or not according to the location of the reference pixel 310 and the location of the target pixel in the rectangular area formed by the interpolation pixel 300 and perform interpolation, it can display the boundary part between the image part and the background part more smoothly, and suppress the color unevenness without performing unwanted interpolation.

Further, according to the embodiment, the projector 100 can suppress the color unevenness without performing interpolation unless the interpolation pixel 300 contains the pixel of the original pixel 400.

Other Embodiments

The application of the invention is not limited to the above described embodiment, but various changes can be made. For example, in the above described embodiment, the interpolation pixel 300 includes longitudinal two pixels and lateral two pixels and the location of the reference pixel 310 is on the upper left in the interpolation pixel 300, however, the number of pixels forming the interpolation pixel 300 is not limited to four, the location of the reference pixel 310 is not limited to the upper left, or the interpolation method is not limited to the bilinear interpolation.

Figure 6:
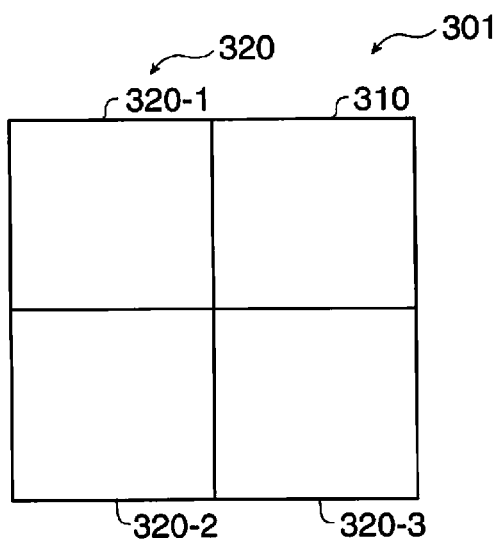
FIG. 6 shows another example of an interpolation pixel.

FIG. 6 shows another example of an interpolation pixel 301. For example, the interpolation pixel 301 includes longitudinal two pixels and lateral two pixels and the location of the reference pixel 310 is on the upper right in the interpolation pixel 301. In this case, the interpolation part 142 performs interpolation when the target pixel is set to the pixel in the output background part in contact with the oblique side located on the right or upper part of the deformed image 600, and does not perform interpolation when the target pixel is set to the other pixels in the output background part.

Figure 7:
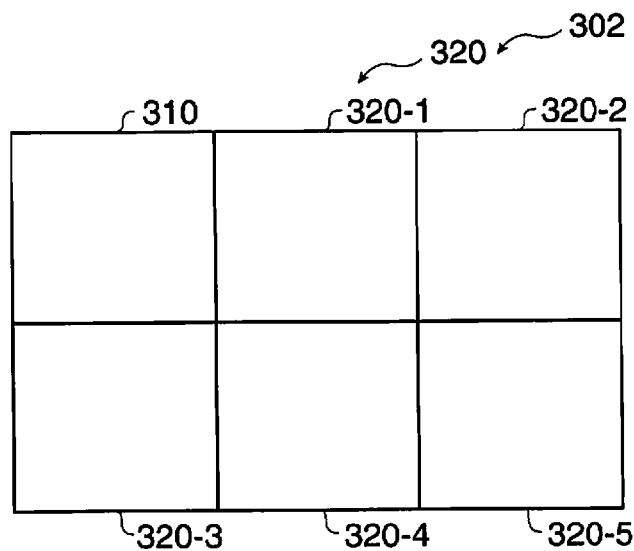
FIG. 7 shows another example of an interpolation pixel.

FIG. 7 shows another example of an interpolation pixel 302. For example, the interpolation pixel 302 includes six pixels of longitudinal two pixels and lateral three pixels and the location of the reference pixel 310 is on the upper left in the interpolation pixel 301. In this case, the interpolation part 142 performs interpolation when the target pixel is set to the pixel in the output background part in contact with the oblique side located on the left or upper part of the deformed image 600, and does not perform interpolation when the target pixel is set to the other pixels in the output background part.

Figure 8:
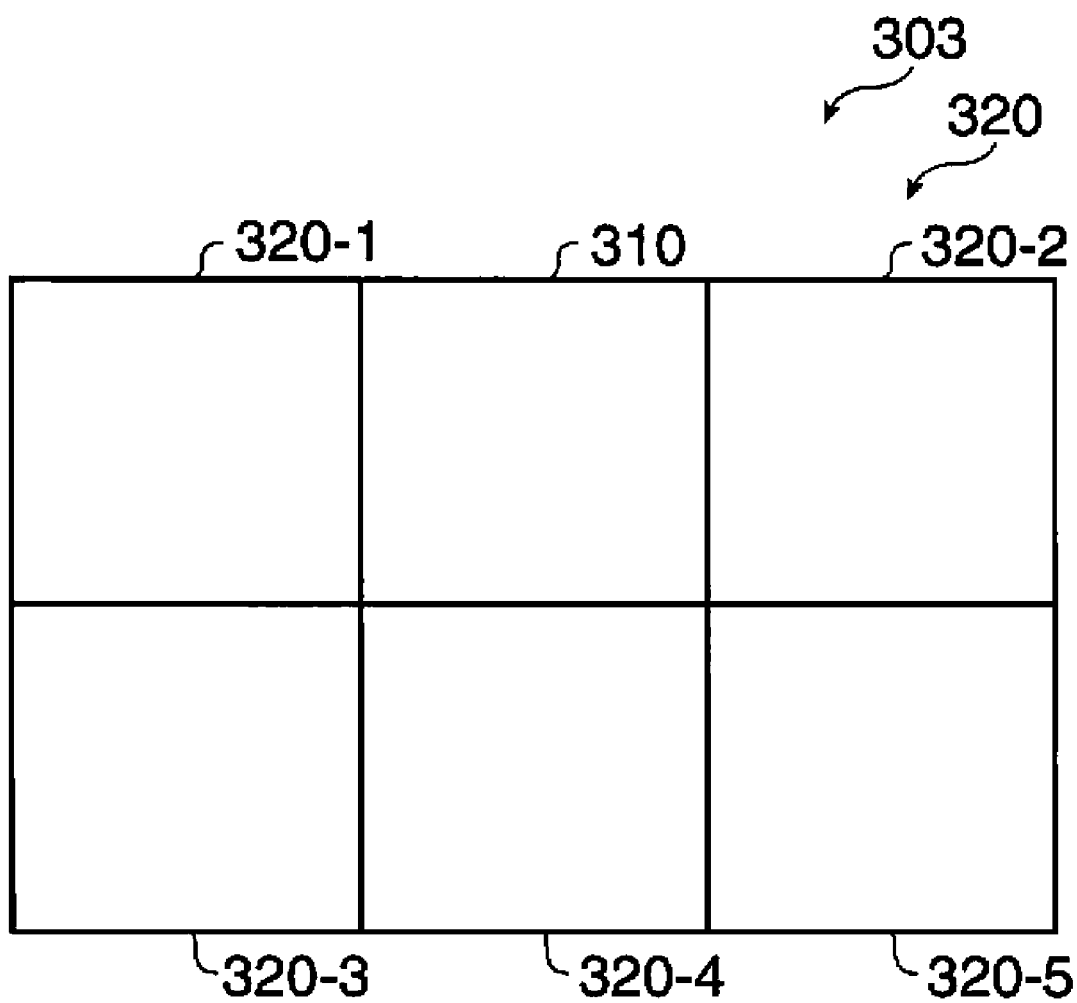
FIG. 8 shows another example of an interpolation pixel.

FIG. 8 shows another example of an interpolation pixel 303. For example, the interpolation pixel 303 includes six pixels of longitudinal two pixels and lateral three pixels and the location of the reference pixel 310 is on the upper middle in the interpolation pixel 301. That is, the reference pixel 310 is in contact with the upper side of the rectangular area of the interpolation pixel 303. In this case, the interpolation part 142 performs interpolation when the target pixel is set to the pixel in the output background part in contact with the oblique side located on the upper part of the deformed image 600, and does not perform interpolation when the target pixel is set to the other pixels in the output background part.

Furthermore, the projector 100 is not limited to the liquid crystal projector, but may be a projector using DMD (Digital Micromirror Device). The DMD is a registered trademark of Texas Instruments, Inc., U.S. Additionally, the function of the projector 100 may be distributed and mounted in plural devices (e.g., PC and projector, or the like).

What is claimed is:

1. An image processing system comprising:
   an interpolation unit that performs interpolation using an input image and a reference pixel in an input background part outside of the input image and interpolation pixels including neighboring pixels around the reference pixel; and
   a target pixel location determination unit that determines a location of a target pixel with respect to an image after distortion correction in a display area of an optical modulator,
   wherein the reference pixel is located in contact with at least one side of a rectangular area formed by the interpolation pixels, and
   wherein, the interpolation unit performs the interpolation using the interpolation pixel corresponding to the target pixel, when the target pixel is located in an output background part in contact with an oblique side of the image after distortion correction and the location of the oblique side with respect to the center of the image after distortion correction coincides with the location of the side in contact with the interpolation pixel with respect to the center of the rectangular area, and
   the interpolation unit does not perform the interpolation, when the target pixel is located in the output background part not in contact with an oblique side of the image after distortion correction or the target pixel is located in the output background part in contact with an oblique side of the image after distortion correction, and the location of the oblique side with respect to the center of the image after distortion correction does not coincide with the location of the side in contact with the interpolation pixel with respect to the center of the rectangular area.

2. The image processing system according to claim 1, wherein the interpolation unit does not perform the interpolation unless the interpolation pixel contains the pixel of the input image even when the target pixel is located in the output background part in contact with an oblique side of the image after distortion correction and the location of the oblique side with respect to the center of the image after distortion correction coincides with the location of the side in contact with the interpolation pixel with respect to the center of the rectangular area.

3. The image processing system according to claim 1, wherein the interpolation is bilinear interpolation, and
   the interpolation pixel includes one of the reference pixel and three of the neighboring pixels.

4. A projector comprising:
   the image processing system according to claim 1; and
   a projection unit that projects the interpolated image after distortion correction.

5. An image processing method performed by a computer having a processor, the method comprising:
   interpolating using an input image and a reference pixel in an input background part outside of the input image and interpolation pixels including neighboring pixels around the reference pixel; and
   determining a location of a target pixel with respect to an image after distortion correction in a display area of an optical modulator,
   wherein the reference pixel is located in contact with at least one side of a rectangular area formed by the interpolation pixels, and
   wherein, the interpolation is performed using the interpolation pixel corresponding to the target pixel, when the target pixel is located in an output background part in contact with an oblique side of the image after distortion correction and the location of the oblique side with respect to the center of the image after distortion correction coincides with the location of the side in contact with the interpolation pixel with respect to the center of the rectangular area, and
   the interpolation is not performed, when the target pixel is located in the output background part not in contact with an oblique side of the image after distortion correction or the target pixel is located in the output background part in contact with an oblique side of the image after distortion correction, and the location of the oblique side with respect to the center of the image after distortion correction does not coincide with the location of the side in contact with the interpolation pixel with respect to the center of the rectangular area.

6. An image processing system comprising:
   an interpolation unit that performs interpolation using an input image and a reference pixel in an input background part outside of the input image and interpolation pixels including neighboring pixels around the reference pixel; and
   a target pixel location determination unit that determines a location of a target pixel with respect to an image after distortion correction in a display area of an optical modulator,
   wherein the reference pixel is located in contact with at least one side of a rectangular area formed by the interpolation pixels, and
   wherein, the interpolation unit performs the interpolation using the interpolation pixel corresponding to the target pixel, when the target pixel is located in an output background part in contact with an oblique side of the image after distortion correction and the location of the oblique side with respect to the center of the image after distortion correction coincides with the location of the side in contact with the interpolation pixel with respect to the center of the rectangular area.

* * * * *